United States Patent [19]

Daigler

[11] 4,428,527

[45] Jan. 31, 1984

[54] THERMOSTATIC VALVE ASSEMBLY

[75] Inventor: Franklin A. Daigler, Lockport, N.Y.

[73] Assignee: General Motors Corporation, Detroit, Mich.

[21] Appl. No.: 416,142

[22] Filed: Sep. 9, 1982

[51] Int. Cl.³ .............................................. F01P 7/02
[52] U.S. Cl. .............................. 236/34.5; 29/157.1 R; 137/519.5
[58] Field of Search .............................. 236/34, 34.5; 137/519.5, 533.11, 533.13; 29/157.1 R

[56] References Cited

U.S. PATENT DOCUMENTS

| | | | |
|---|---|---|---|
| 248,902 | 11/1881 | Whitman | 137/533.13 X |
| 886,882 | 5/1908 | Smith | 251/121 X |
| 1,770,926 | 7/1930 | Hoye | 137/533.11 |
| 2,109,269 | 2/1938 | Kohut | 137/519.5 X |
| 2,386,974 | 10/1945 | Hennessy | 137/533.13 |
| 2,390,749 | 12/1945 | Swift | 137/519.5 |
| 3,620,228 | 11/1971 | Schmid | 137/519.5 X |
| 4,052,965 | 10/1977 | Morris | 236/34.5 X |
| 4,059,881 | 11/1977 | Sliger | 29/157.1 R |
| 4,193,542 | 3/1980 | Knauss | 236/34.5 |

OTHER PUBLICATIONS

"The Shape of Ball Check Valves", pp. 98, 99, Product Engineering, vol. 33, No. 25, Dec. 10, 1962, Marvin D. Nelson.

Primary Examiner—William E. Tapolcai
Attorney, Agent, or Firm—R. L. Phillips

[57] ABSTRACT

A thermostatic valve assembly is disclosed having a vent valve retainer that is configured so as to be formed together with an otherwise conventional frame from flat sheet stock and thereafter formed to a confining shape about a ball vent valve element that is closeable on a vent hole in a mounting flange to which the frame attaches.

3 Claims, 5 Drawing Figures

THERMOSTATIC VALVE ASSEMBLY

This invention relates to thermostatic valves and more particularly to the inclusion of a venting valve therewith.

In thermostatic valves such as used in engine cooling systems, it is common practice to include a vent valve that operates to vent air that might otherwise be trapped in the system when the thermostatic valve is closed. These vent valves have taken various forms. For example, there is the "jiggle" pin type as disclosed in U.S. Pat. No. 2,829,835 as well as a wide variety of ball check designs as disclosed in U.S. Pat. Nos. 3,973,729; 4,011,988; 4,052,965 and 4,193,542.

The present invention is an improvement over such prior devices and in particular those having a frame formed from flat sheet metal stock. In the latter, the frame typically attaches to a mounting flange and serves as a spring seat for a flow valve that is operated by a thermal actuating device. The present invention makes use of this frame to form a retainer for a simple check valve ball element that is closeable on a vent opening in the mounting flange. This is accomplished in the preferred construction with a first extension that is integral with and extends from the frame and a second extension that is integral with and extends from the first extension. Both extensions are configured so as to be formed together with the frame from flat sheet metal stock with the first extension thereafter formable to extend at least partially about the vent hole and the second extension then formable after insertion of the vent valve ball element within the first formed extension to extend at least partially over an otherwise open end of the latter. The extensions cooperate as part of the frame and with the flange to retain the vent valve ball element in seating relationship with the vent hole and without substantially restricting venting therethrough when the vent valve is opened.

These and other objects, advantages and features of the present invention will become more apparent from the following description and drawing in which.

Figure 1:
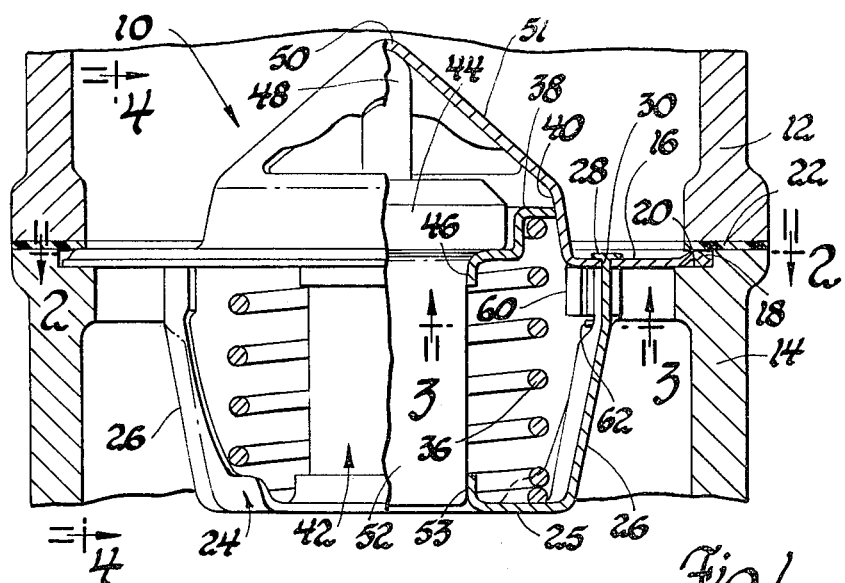
FIG. 1 is a side view partially in section of a thermostatic valve assembly installed in an engine cooling system and having incorporated therein the preferred embodiment of the vent valve retainer according to the present invention.
Figure 2:
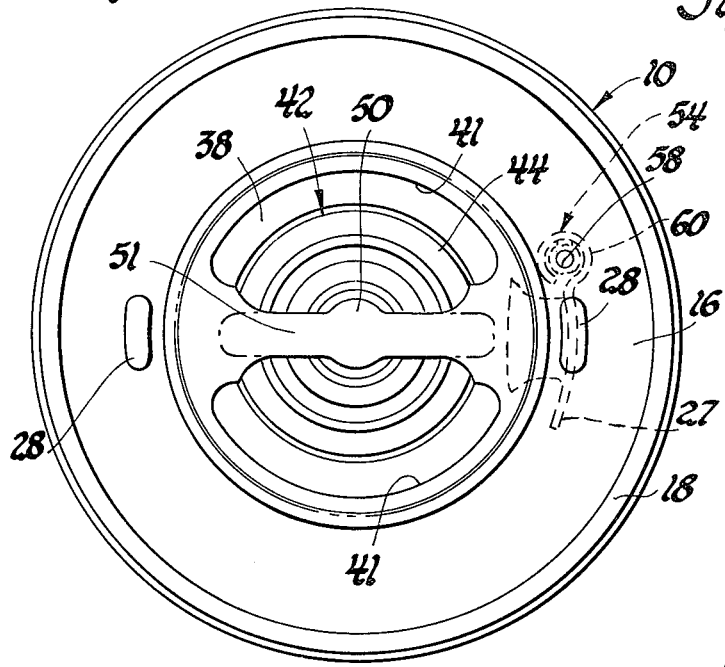
FIG. 2 is a view taken along the line 2—2 in FIG. 1.

Referring to FIG. 1, there is shown a thermostatic valve assembly generally designated as 10 installed in an internal combustion engine cooling system between two coupling members 12 and 14. The thermostatic valve assembly comprises a mounting flange 16 having an annular beaded periphery 18 which is received in a counterbore 20 on coupling member 14 and seats on its opposite side against a gasket 22 which forms a seal between opposing annular end faces of the two coupling members 12 and 14. A frame 24 having an annular spring seat 25 is attached to the mounting flange 16 by a pair of integral arms 26. The arms 26 are located diametrically opposite and each have a transverse abutment 27 and an end tab 28 that extends through and is swaged over a slot 30 in the flange so as to hold the latter against the abutments. A helical return spring 36 is mounted on the valve seat 25 and engages at its opposite end with an annular flow control valve element 38. The valve element 38 is engageable as shown with a conical valve seat 40 formed on the underside of the flange member 16 to close off flow through semicircular openings 41 in the flange. A thermal responsive actuating device in the form of a wax filled power element 42 is mounted in the thermostatic valve assembly by being fixed at a collar portion 44 thereof in a central opening 46 of the valve member 38 and having its actuating pin 48 engaged against an apex portion 50 of a bridge 51 spanning the valve seat 40. The cylindrical body 52 of the power element is telescopically received in a central opening 53 of the frame 24 and on a temperature rise in the coolant above a predetermined level, the power element is responsive to telescope downward retracting the flow valve 38 off its seat 40 against the bias of the spring 36 to then permit flow through the thermostatic valve.

The thermostatic valve assembly thus far described is of conventional construction and has the characteristic that the frame 24 as well as the flange 16 and valve 38 can be stamped and formed from flat sheet metal stock at low cost. According to the present invention, a vent valve generally designated as 54 is simply incorporated in the assembly by making use of the frame 24 to form the retainer or housing for a ball valve element 56 that opens to vent one side of the flange to the other through a hole 58 therein and closes thereon to prevent reverse communication in response to pressure differential. Such venting, of course, operates to vent air that might otherwise be trapped in the engine cooling system when the thermostatic valve 38 is closed as is well known.

Figure 3:
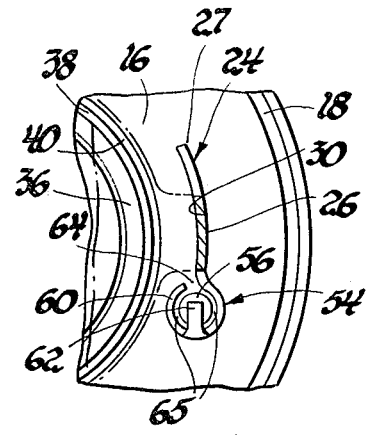
FIG. 3 is a view taken along the line 3—3 in FIG. 1.
Figure 5:
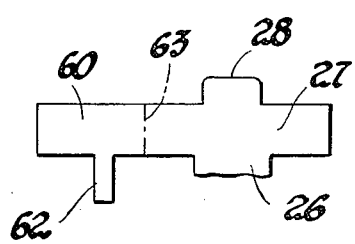
FIG. 5 is a plan view of the retainer configuration after stamping and prior to the formation thereof to retain the check valve ball element.
Figure 4:
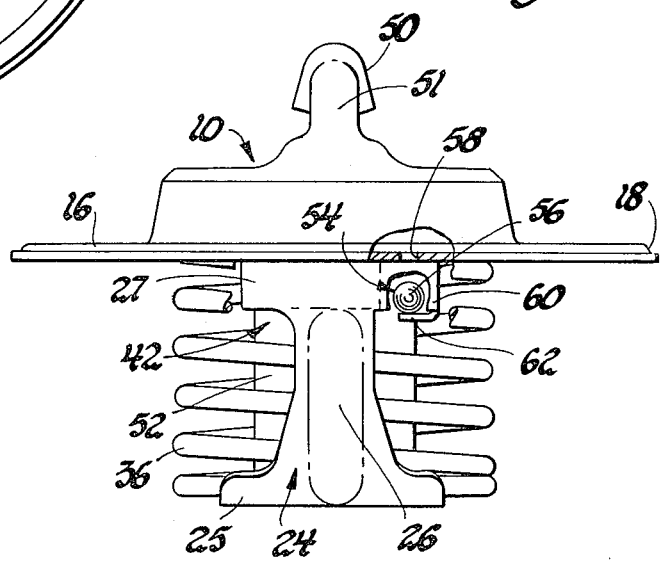
FIG. 4 is a side view of the thermostatic valve assembly in FIG. 1 prior to installation and with parts broken away to expose the vent valve.

The improved retainer comprises a first extension 60 integral with and extending from the frame 24 and a second extension 62 integral with and extending from the first extension 60. These extensions are formed integral with the abutment portion 27 of one of the attaching frame member arms 26 and extend from what would normally be one of two terminal ends thereof as shown by the phantom line 63 in FIG. 5. Both the extensions 60 and 62 are configured so as to be formed together with the frame 24 from flat sheet metal stock as shown in FIG. 5 and then bent to define the desired vent valve retainer shape shown in the other Figures. To this end, the first extension 60 extends in-line from the normal abutment 27 as seen in FIG. 5 so as to then be formable to extend circularly about the vent hole 58 leaving an end gap 64 with itself as seen in FIG. 3. The second extension 62 on the other hand extends at right angles to the first extension back alongside and parallel to the originating integral frame arm 26 as seen in FIG. 5. The second extension 62 is then formable after insertion of the ball valve element 56 within the first formed and now circular extension 60 so as to extend at least partially over the otherwise open end of the latter and thereafter block exit of the ball valve element while leaving semi-circular gaps 65 either side of the scond extension as seen in FIG. 3. Thus, both the extensions 60 and 62 cooperate as part of the frame 24 and with the flange 16 to retain the ball valve 56 in seating relationship with the vent hole and without substantially restricting venting therethrough when the vent valve is opened by provision of the three retainer gaps 64 and 65. Thus, the present invention makes use of the thermostat frame as a retainer for the check valve element thereby eliminating the need for a separate ball retainer with a resulting savings of material and labor for the assembly. Moreover, both the formation of the retainer and feeding of the ball can be done with automatic equipment to further reduce the cost.

The above described preferred embodiment is thus illustrative of the invention which may be modified within the scope of the appended claims.

The embodiments of the invention in which an exclusive property or privilege is claimed are defined as follows:

1. In a thermostatic valve assembly for a fluid system requiring venting as well as temperature controlled flow wherein the assembly comprises a mounting flange, a frame having the characteristic that it can be formed from flat sheet stock so as to attach to the frame and together therewith support a spring biased thermally actuated flow valve and a vent valve element that opens to vent one side of the flange to the other through a hole therein and closes same in response to pressure differential: the vent valve element comprising an improved retainer comprising a first extension integral with and extending from the frame and a second extension integral with and extending from said first extension, both said extensions being configured so as to be formed together with the frame from flat sheet stock with said first extension thereafter formable to extend at least partially about the hole and said second extension then formable after insertion of the vent valve element within said first formed extension to extend at least partially over an otherwise open end of the latter whereby said extensions cooperate as part of the frame and with the flange to retain the vent valve element in seating relationship with the vent hole and without substantially restricting venting therethrough when the vent hole is opened thereby.

2. In a thermostatic valve assembly for a fluid system requiring venting as well as temperature controlled flow wherein the assembly comprises a mounting flange, a frame having the characteristic that it can be formed from flat sheet stock so as to attach with integral arms to the frame and together therewith support a spring biased thermally actuated flow valve, and a vent valve element that opens to vent one side of the flange to the other through a hole therein and closes same in response to pressure differential: the vent valve element comprising an improved retainer comprising a first extension integral with and extending from one arm of the frame and a second extension integral with and extending from said first extension, both said extensions being configured so as to be formed together with the frame from flat sheet stock with said first extension thereafter formable to extend at least partially about the hole and said second extension then formable after insertion of the vent valve element within said first formed extension to extend at least partially over an otherwise open end of the latter whereby said extensions cooperate as art of the frame and with the flange to retain the vent valve element in seating relationship with the vent hole and without substantially restricting venting therethrough when the vent hole is opened thereby.

3. In a thermostatic valve assembly for a fluid system requiring venting as well as temperature controlled flow wherein the assembly comprises a mounting flange, a frame having the characteristic that it can be formed from flat sheet stock so as to attach with a pair of integral arms to the frame and together therewith support a spring biased thermally actuated flow valve, and a ball vent valve element that opens to vent one side of the flange to the other through a hole therein and closes same in response to pressure differential: the ball vent valve element comprising an improved retainer comprising a first extension integral with and extending from one arm of the frame and a second extension integral with and extending from said first extension, both said extensions being configured so as to be formed together with the frame from flat sheet stock with said first extension thereafter formable to extend circularly partially about the hole and leave a first gap at the end of said first extension and said second extension then formable after insertion of the ball vent valve element within said first formed extension to extend partially over an otherwise open end of the latter and leave gaps along opposite edges of second extension whereby said extensions cooperate as part of the frame and with the flange to retain the ball vent valve element in seating relationshp with the vent hole and without substantially restricting venting therethrough when the vent hole is opened thereby by the provision of said gaps.

* * * * *

UNITED STATES PATENT AND TRADEMARK OFFICE
CERTIFICATE OF CORRECTION

PATENT NO. : 4,428,527
DATED : January 31, 1984
INVENTOR(S) : Franklin A. Daigler It is certified that error appears in the above—identified patent and that said Letters Patent is hereby corrected as shown below:

Column 2, line 61, "scond" should read -- second --.

Column 4, line 13, claim 2, "art" should read -- part --.

Signed and Sealed this

Twenty-second Day of May 1984

[SEAL]

Attest:

GERALD J. MOSSINGHOFF

Attesting Officer   Commissioner of Patents and Trademarks